(12) United States Patent
Schmidl et al.

(10) Patent No.: US 8,503,553 B2
(45) Date of Patent: Aug. 6, 2013

(54) PILOT SUBCARRIERS IN WIRELESS TRANSMISSIONS

(75) Inventors: Timothy M. Schmidl, Dallas, TX (US); Anuj Batra, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 254 days.

(21) Appl. No.: 12/961,032

(22) Filed: Dec. 6, 2010

(65) Prior Publication Data

US 2011/0150115 A1    Jun. 23, 2011

Related U.S. Application Data

(60) Provisional application No. 61/287,577, filed on Dec. 17, 2009, provisional application No. 61/362,152, filed on Jul. 7, 2010.

(51) Int. Cl.
    *H04K 1/10*    (2006.01)
(52) U.S. Cl.
    USPC ........... 375/260; 375/262; 375/267; 375/340; 375/343; 375/346; 375/350
(58) Field of Classification Search
    USPC ............. 375/260, 262, 265, 267, 340, 343, 375/346, 350; 370/203, 204, 205, 208, 209, 370/210
    See application file for complete search history.

(56) References Cited

U.S. PATENT DOCUMENTS

| 7,859,987 | B2* | 12/2010 | Ouyang et al. | 370/208 |
|---|---|---|---|---|
| 8,064,414 | B2* | 11/2011 | Wallace et al. | 370/338 |
| 8,175,123 | B2* | 5/2012 | Vrcelj et al. | 370/510 |
| 2007/0040703 | A1 | 2/2007 | Akkarakaran et al. | |
| 2008/0165969 | A1 | 7/2008 | Aamod et al. | |
| 2009/0080561 | A1 | 3/2009 | Zhaocheng et al. | |
| 2009/0109999 | A1* | 4/2009 | Kuri et al. | 370/465 |
| 2010/0190509 | A1* | 7/2010 | Davis | 455/456.1 |
| 2011/0249644 | A1* | 10/2011 | Boariu et al. | 370/329 |

OTHER PUBLICATIONS

Institute of Electrical and Electronics Engineers, Inc., "IEEE Standard for Information technology—Telecommunications and information exchange between systems—Local and metropolitan area networks—Specific requirements," Part 15.4: Wireless Medium Access Control (MAC) and Physical Layer (PHY) Specifications for Low-Rate Wireless Personal Area Networks (WPANs), IEEE Std 802.15.4™, Sep. 8, 2006, New York, NY.

* cited by examiner

*Primary Examiner* — Dhaval Patel
(74) *Attorney, Agent, or Firm* — John R. Pessetto; W. James Brady; Frederick J. Telecky, Jr.

(57) ABSTRACT

An integrated circuit includes logic configured to encode pilot signals in a first set of subcarriers of an orthogonal frequency division multiplexing ("OFDM") symbol and in a second set of subcarriers of a consecutive OFDM symbol. The symbol and the consecutive symbol are in the same smart-utility-network packet.

10 Claims, 4 Drawing Sheets

| SYMBOL 1 | SYMBOL 2 | SYMBOL 3 | SYMBOL 4 | SYMBOL 5 | SYMBOL 6 | SYMBOL 7 | SYMBOL 8 | SYMBOL 9 |
|---|---|---|---|---|---|---|---|---|
| • -20 | • -20 | • -20 | • -24 | • -24 | • -24 | • -15 | • -15 | • -15 |
| • -6 | • -6 | • -6 | • -11 | • -11 | • -11 | • -2 | • -2 | • -2 |
| • 6 | • 6 | • 6 | • 2 | • 2 | • 2 | • 11 | • 11 | • 11 |
| • 20 | • 20 | • 20 | • 15 | • 15 | • 15 | • 24 | • 24 | • 24 |

PILOT SUBCARRIERS IN WIRELESS TRANSMISSIONS

CROSS-REFERENCE TO RELATED APPLICATION

The present application claims priority to U.S. Provisional Patent Application No. 61/287,577, filed on Dec. 17, 2009 and U.S. Provisional Patent Application No. 61/362,152, filed on Jul. 7, 2010; both of which are hereby incorporated herein by reference.

BACKGROUND

Wireless personal area networks ("WPANs") are used to convey information over relatively short distances. Unlike wireless local area networks ("WLANs"), WPANs need little or no infrastructure, and WPANS allow small, power-efficient, and inexpensive solutions to be implemented for a wide range of problems. Smart utility networks ("SUNs") may operate either over short ranges, such as in a mesh network where utility meter information is sent from one utility meter to another, or over longer ranges, such as in a star topology where utility meter information is sent to a poletop collection point. The terms WPAN and SUN are used interchangeably in this document.

SUMMARY

An integrated circuit includes logic configured to encode pilot signals in a first set of subcarriers of an orthogonal frequency division multiplexing ("OFDM") symbol and in a second set of subcarriers, possibly different from the first set, of a consecutive OFDM symbol. The symbol and the consecutive symbol are in the same smart-utility-network packet.

A method includes encoding pilot signals in a first set of subcarriers of an orthogonal frequency division multiplexing ("OFDM") symbol. The method further includes encoding pilot signals in a second set of subcarriers, different from the first set, of a consecutive OFDM symbol; the symbol and the consecutive symbol being in the same smart-utility-network packet.

A machine-readable storage medium includes executable instructions that, when executed, cause one or more processors to encode pilot signals in a first set of subcarriers of an OFDM symbol and in a second set of subcarriers, possibly different from the first set, of a consecutive OFDM symbol. The symbol and the consecutive symbol are in the same smart-utility-network packet.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following claims and description to refer to particular components. As one skilled in the art will appreciate, different entities may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean an optical, wireless, indirect electrical, or direct electrical connection. Thus, if a first device couples to a second device, that connection may be through an indirect electrical connection via other devices and connections, through a direct optical connection, etc. Additionally, the term "system" refers to a collection of two or more hardware components, and may be used to refer to an electronic device or a subsystem of an electronic device.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

A WPAN or low-rate WPAN is a simple, low-cost communication network that allows wireless connectivity in applications with limited power and relaxed throughput requirements. The main objectives of a WPAN are ease of installation, reliable data transfer, short-range operation, extremely low cost, reasonable battery life, and a simple but flexible protocol.

Some characteristics of a WPAN in accordance with some embodiments are:
- Over-the-air data rates of 250 kb/s, 100 kb/s, 40 kb/s, and 20 kb/s
- Star or peer-to-peer operation
- Allocated 16-bit short or 64-bit extended addresses
- Optional allocation of guaranteed time slots
- Carrier sense multiple access with collision avoidance channel access
- Low power consumption
- Energy detection
- Link quality indication
- 16 channels in the 2450 MHz band, 30 channels in the 915 MHz band, and 3 channels in the 868 MHz band.

These characteristics are not requirements, and each WPAN may deviate from the characteristics in numerous ways. Two different device types can participate in a WPAN: a full-function device ("FFD") and a reduced-function device ("RFD"). The FFD can serve as a personal area network ("PAN") coordinator or a device. A FFD can communication with RFDs or other FFDs while a RFD can communicate only with a FFD. More information can be found at IEEE Std. 802.15.4-2006 available at http://www.ieee802.org/15/pub/TG4.html and hereby incorporated by reference.

A utility network or smart utility network ("SUN") is a low-rate (e.g., 40 kbps to 1 Mbps) low-power WPAN that is specifically designed for use in utility metering applications such as transmitting electric, gas, water usage, and other like data from the customer premises to a data collection point operated by the utility. For example, utility meters are installed for each house in a residential neighborhood, and the usage data is sent periodically from each utility meter to a data collection point, which is an element of the WPAN. The data collection point is connected by fiber, copper wire, or wireless connection to a central office that collects all the usage data for a region. Usage data is sent either directly from each utility meter to the collection point or from utility meter to utility meter until the collection point is reached in a star or network formation, respectively.

Figure 1:
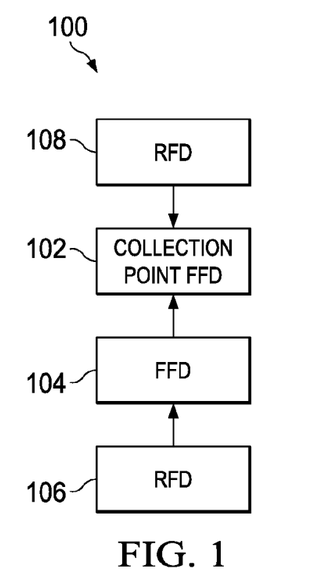
FIG. 1 illustrates a SUN network in accordance with at least one illustrated embodiment.
Figure 2:
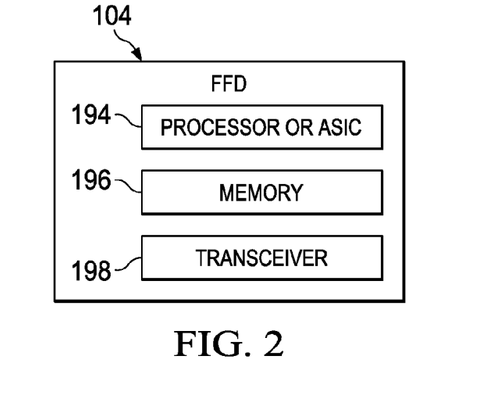
FIG. 2 illustrates a SUN network element in accordance with at least one illustrated embodiment.

FIG. 1 illustrates a SUN 100. Data is periodically sent to collection point FFD 102 by three devices: FFD 104, RFD 106, and RFD 108. The devices 104, 106, 108 can monitor and record any type of information such as utility usage for commercial or residential buildings in at least one embodiment. While RFD 108 sends data to collection point FFD 102 directly, RFD 106 sends data to FFD 104, and FFD 104 sends the data from RFD 106 to collection point FFD 102. FFD 104 also sends its own data to collection point FFD 102. The collection point FFD 102 is at or is monitored by the utility provider in at least one embodiment. FIG. 2 illustrates a network element, in this case the FFD 104, of a SUN 100. The FFD 104 comprises a transceiver 198, memory 196, and a processor 194. In at least one embodiment, the FFD 104 comprises an application specific integrated circuit ("ASIC"). Either the processor or the ASIC can execute or comprise logic to cause execution of any action described herein with regard to an associated network element 104. Specifically, instructions and software can be executed. The transceiver transmits and receives communication from the other elements of the network 100. The memory stores data and instructions to be manipulated and executed by the processor.

The SUN 100 preferably uses orthogonal frequency division multiplexing ("OFDM") for communication between the elements 102, 104, 106, and 108. OFDM is a signal modulation technique in which a number of closely spaced orthogonal subcarriers are used to carry data. The data is divided into several parallel data streams or channels, one for each sub-carrier. Each sub-carrier is modulated with a modulation scheme such as quadrature amplitude modulation ("QAM") or binary phase-shift keying ("BPSK"). Some of the subcarriers may carry pilot signals used for measurement of the channel conditions (i.e., the equalizer gain and phase shift for each sub-carrier), time synchronization (to reduce inter-symbol interference ("ISI")), and frequency synchronization (to reduce inter-carrier interference ("ICI") and Doppler shift or spread). The terms "pilot signal" and "pilot value" are used interchangeably herein. Specifically, the pilot signals are known, test, and/or reference signals. When transmitted, the pilot signals are subject to the same noise as unknown signals. Because the signals are known, the noise can be measured, and the measurement can be applied to compensate for the noise on unknown signals.

Table 1 lists 4 illustrative configuration options for OFDM transmission in WPAN networks. While these configuration options are preferable, any of the variables can be adjusted as conditions merit.

TABLE 1

|  | Option 1 | Option 2 | Option 3 | Option 4 | Unit |
| --- | --- | --- | --- | --- | --- |
| Sampling Rate | 1333333.33 | 666666.666 | 333333.333 | 166666.666 | Samp/sec |
| FFT size | 128 | 64 | 32 | 16 | point |
| Tone Spacing | 10416.66667 | 10416.66667 | 10416.66667 | 10416.66667 | Hz |
| FFT Duration | 96 | 96 | 96 | 96 | microsec |
| Guard Interval | 24 | 24 | 24 | 24 | microsec |
| Symbol Duration | 120 | 120 | 120 | 120 | microsec |
| Symbol Rate | 8.33333333 | 8.33333333 | 8.33333333 | 8.33333333 | k Sym/sec |
| Active Tones | 104 | 52 | 26 | 14 |  |
| Pilots tones | 8 | 4 | 2 | 2 |  |
| Data Tones | 96 | 48 | 24 | 12 |  |
| Null tones | 1 | 1 | 1 | 1 |  |
| Approximate Signal Bandwidth | 1.09E+06 | 5.52E+05 | 2.81E+05 | 1.56E+05 | Hz |
| BPSK 1/2 rate coded and 4x repetition | 100.00 | 50.00 | 25.00 | 12.50 | kbps |
| BPSK 1/2 rate coded and 2x repetition | 200.00 | 100.00 | 50.00 | 25.00 | kbps |
| BPSK 1/2 rate coded | 400.00 | 200.00 | 100.00 | 50.00 | kbps |
| BPSK 3/4 rate coded | 600.00 | 300.00 | 150.00 | 75.00 | kbps |
| QPSK 1/2 rate coded | 800.00 | 400.00 | 200.00 | 100.00 | kbps |
| QPSK 3/4 rate coded | 1200.00 | 600.00 | 300.00 | 150.00 | kbps |
| 16-QAM 1/2 rate coded | 1600.00 | 800.00 | 400.00 | 200.00 | kbps |
| 16-QAM 3/4 rate coded | 2400.00 | 1200.00 | 600.00 | 300.00 | kbps |
| Raw rate (BPSK, no coding, no repetition) | 800.00 | 400.00 | 200.00 | 100.00 | kbps |
| Suggested Channel Spacing | 1200 | 600 | 400 | 200 | kHz |

As can be seen in Table 1, for Options 1, 2, 3, and 4, there are respectively 8, 4, 2, and 2 pilot tones, also called pilot data, per symbol. Each pilot tone is on a separate subcarrier, and the null tone is not used. Collectively, the subcarriers with pilot signals make up the pilot set. For options 1, 2, 3, and 4 there are 13, 7, 7, and 4 pilot sets, respectively.

Figure 3:
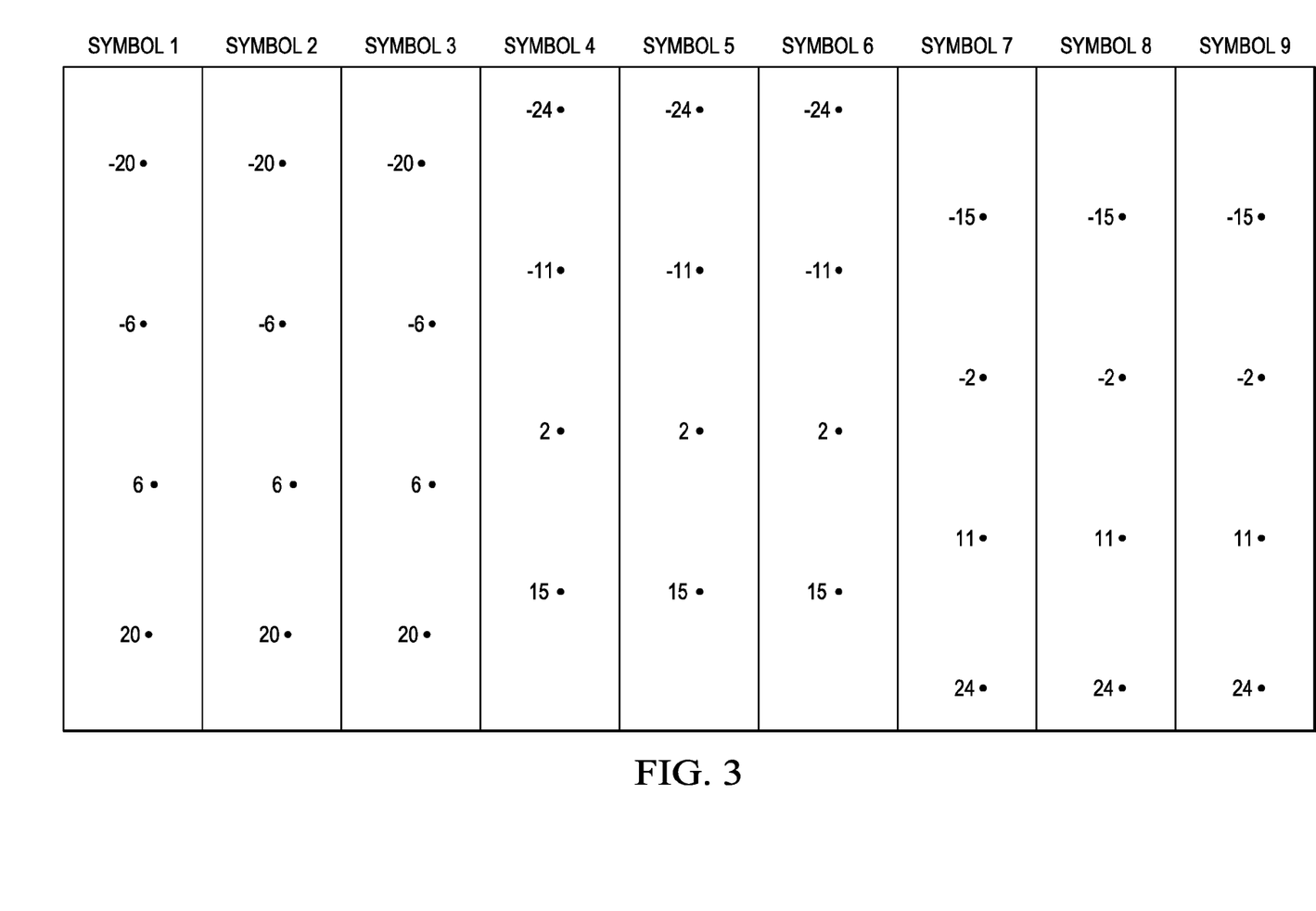
FIG. 3 illustrates repeated and staggered pilot subcarriers in accordance with at least one illustrated embodiment.

FIG. 3 illustrates pilot sets for option 2 with a repetition length of 3. For any option, the repetition length can be any positive integer. The numbers represent the subcarriers occupied by the pilot data for the OFDM symbols 1 to 9. In symbol 1, the pilot set is −20, −6, 6, and 20 because those subcarriers contain pilot data. The null tone is 0. The same pilot set is repeated for symbols 2 and 3. As such, the pilot repetition length is 3. For symbols 4-6, the pilot set is −24, −11, 2, and 15. Because the subcarriers containing pilot data have changed, the pilots are considered staggered. For symbols 7-9, the pilot set is −15, −2, 11, and 24. In FIG. 3, the subcarriers containing pilot data are distributed within the symbol. For example, the pilot subcarriers are not adjacent to each other. The distribution within the symbol persists even as the pilot set changes from symbol 3 to 4 and from symbol 6 to 7. The repetition length, staggering amount, and distribution amount can be adjusted as warranted by network conditions. For example, the repetition length can be changed from 3 to 10 or 1. The duration of 10 symbols can be used for systems with low or decreasing Doppler shift or spread, and the duration of 1 symbol can be used for systems with high or increasing Doppler shift or spread.

For Option 1, 13 pilot sets are used as enumerated in Table 2. The subcarriers are numbered from −52 to 52 with the null tone (subcarrier 0) unused.

TABLE 2

| | | | | | | | | |
|---|---|---|---|---|---|---|---|---|
| Pilot set 1 | −38 | −26 | −14 | −2 | 10 | 22 | 34 | 46 |
| Pilot set 2 | −46 | −34 | −22 | −10 | 2 | 14 | 26 | 38 |
| Pilot set 3 | −42 | −30 | −18 | −6 | 6 | 18 | 30 | 42 |
| Pilot set 4 | −50 | −38 | −26 | −14 | −2 | 10 | 22 | 50 |
| Pilot set 5 | −46 | −34 | −22 | −10 | 2 | 14 | 34 | 46 |
| Pilot set 6 | −42 | −30 | −18 | −6 | 6 | 18 | 26 | 38 |
| Pilot set 7 | −50 | −38 | −26 | −14 | −2 | 30 | 42 | 50 |
| Pilot set 8 | −46 | −34 | −22 | −10 | 10 | 22 | 34 | 46 |
| Pilot set 9 | −42 | −30 | −18 | −6 | 2 | 14 | 26 | 38 |
| Pilot set 10 | −50 | −38 | −26 | 6 | 18 | 30 | 42 | 50 |
| Pilot set 11 | −46 | −34 | −14 | −2 | 10 | 22 | 34 | 46 |
| Pilot set 12 | −42 | −30 | −22 | −10 | 2 | 14 | 26 | 38 |
| Pilot set 13 | −50 | −18 | −6 | 6 | 18 | 30 | 42 | 50 |

For Option 1, an alternative approach is to use 3 pilot sets. Alternate pilot set 1 comprises subcarriers −46, −33, −19, −6, 6, 19, 33, and 46. Alternate pilot set 2 comprises subcarriers −50, −37, −24, −11, 2, 15, 28, and 41. Alternate pilot set 3 comprises subcarriers −41, −28, −15, −2, 11, 27, 37, and 50.

Figure 4:
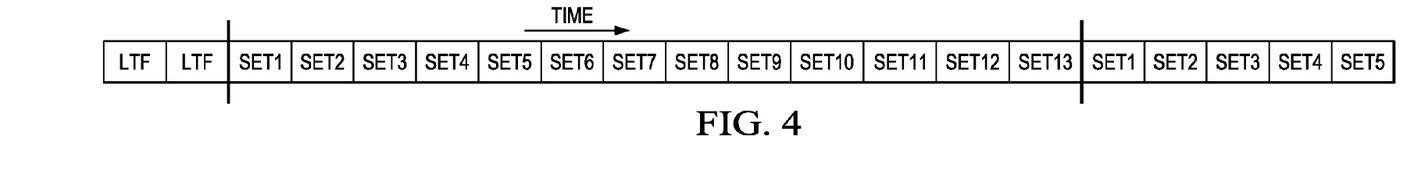
FIG. 4 illustrates staggered pilot subcarriers for configuration option 1 in accordance with at least one illustrated embodiment.

FIG. 4 illustrates a partial SUN packet and how the pilot sets cycle for Option 1. After 2 long training field ("LTF") sets, the vertical line indicates where pilot set 1 is used. For the next symbol, pilot set 2 is used. For consecutive symbols, pilot sets 3-13 are used. After pilot set 13, the vertical line indicates where pilot set 1 is again used. As illustrated, the repetition length is 1. The pilot sets are cyclically extended to fit the number of symbols in the packet.

For Option 2, 7 pilot sets are used as enumerated in Table 3. The subcarriers are numbered from −26 to 26 with the null tone (subcarrier 0) unused.

TABLE 3

| | | | | |
|---|---|---|---|---|
| Pilot set 1 | −14 | −2 | 10 | 22 |
| Pilot set 2 | −22 | −10 | 2 | 14 |
| Pilot set 3 | −18 | −6 | 6 | 18 |
| Pilot set 4 | −26 | −14 | −2 | 26 |
| Pilot set 5 | −22 | −10 | 10 | 22 |
| Pilot set 6 | −18 | −6 | 2 | 14 |
| Pilot set 7 | −26 | 6 | 18 | 26 |

For Option 2, an alternative approach is to use 3 pilot sets. Alternate pilot set 1 comprises subcarriers −20, −6, 6, and 20. Alternate pilot set 2 comprises subcarriers −24, −11, 2, and 15. Alternate pilot set 3 comprises subcarriers −15, −2, 11, and 24.

Figure 5:
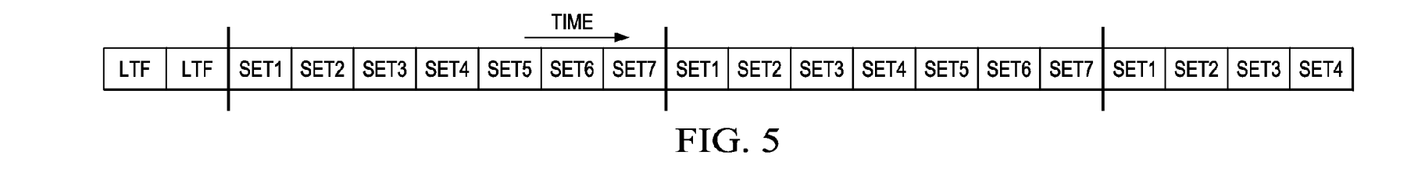
FIG. 5 illustrates staggered pilot subcarriers for configuration options 2 and 3 in accordance with at least one illustrated embodiment.

FIG. 5 illustrates a partial SUN packet and how the pilot sets cycle for Option 2. After 2 LTF sets, the vertical line indicates where pilot set 1 is used. For the next symbol, pilot set 2 is used. For consecutive symbols, pilot sets 3-7 are used. After pilot set 7, the vertical line indicates where pilot set 1 is again used. As illustrated, the repetition length is 1.

For Option 3, 7 pilot sets are used as enumerated in Table 4. The subcarriers are numbered from −13 to 13 with the null tone (subcarrier 0) unused.

TABLE 4

| | | |
|---|---|---|
| Pilot set 1 | −7 | 7 |
| Pilot set 2 | −11 | 3 |
| Pilot set 3 | −3 | 11 |
| Pilot set 4 | −9 | 5 |
| Pilot set 5 | −5 | 9 |
| Pilot set 6 | −13 | 1 |
| Pilot set 7 | −1 | 13 |

For Option 3, an alternative approach is to use 3 pilot sets. Alternate pilot set 1 comprises subcarriers −7, and 7. Alternate pilot set 2 comprises subcarriers −11 and 2. Alternate pilot set 3 comprises subcarriers −2 and 11.

FIG. 5 also illustrates how the pilot sets cycle for Option 3. After 2 LTF sets, the vertical line indicates where pilot set 1 is used. For the next symbol, pilot set 2 is used. For consecutive symbols, pilot sets 3-7 are used. After pilot set 7, the vertical line indicates where pilot set 1 is again used. As illustrated, the repetition length is 1.

For Option 4, 4 pilot sets are used as enumerated in Table 5. The subcarriers are numbered from −7 to 7 with the null tone (subcarrier 0) unused.

TABLE 5

| | | |
|---|---|---|
| Pilot set 1 | −3 | 5 |
| Pilot set 2 | −7 | 1 |
| Pilot set 3 | −5 | 3 |
| Pilot set 4 | −1 | 7 |

For Option 4, an alternative approach is to use 2 pilot sets. Alternate pilot set 1 comprises subcarriers −6, and −2. Alternate pilot set 2 comprises subcarriers 2 and 6.

Figure 6:
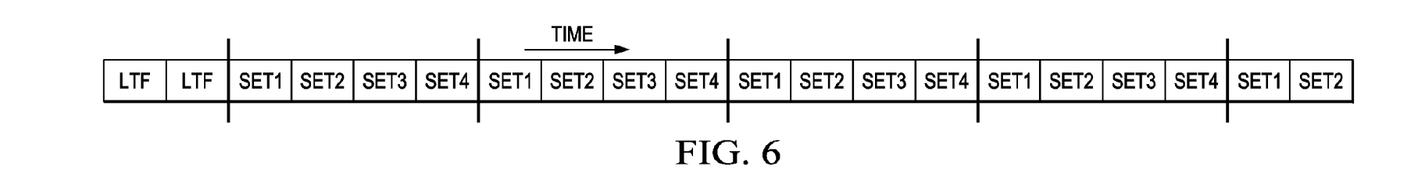
FIG. 6 illustrates staggered pilot subcarriers for configuration option 4 in accordance with at least one illustrated embodiment.

FIG. 6 illustrates a partial SUN packet and how the pilot sets cycle for Option 4. After 2 LTF sets, the vertical line indicates where pilot set 1 is used. For the next symbol, pilot set 2 is used. For consecutive symbols, pilot sets 3-4 are used. After pilot set 4, the vertical line indicates where pilot set 1 is again used. As illustrated, the repetition length is 1.

Figure 7:
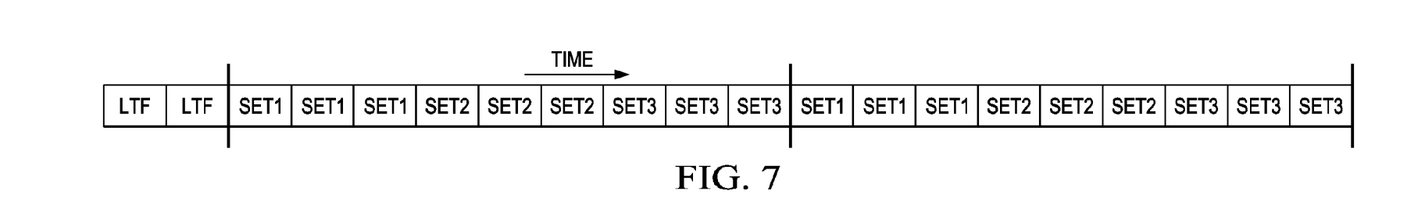
FIG. 7 illustrates staggered repeated subcarriers in accordance with at least one illustrated embodiment.

FIG. 7 illustrate a partial SUN packet and a repetition length of 3. After 2 LTF sets, the vertical line indicates where pilot set 1 is used. For the next two symbols, pilot set 1 is used again. For three consecutive symbols, pilot set 2 is used. For three consecutive symbols, pilot set 3 is used. After the third use of pilot set 3, the vertical line indicates where pilot set 1 is again used.

The known reference data carried on the selected pilot subcarriers is determined based on a pseudo-noise sequence. A pseudo-noise generator performs operations on a seed to generate a sequence of data. For example, a pseudo-noise 9 ("PN9") generator uses a 9-bit binary seed such as 111111111 to create a series of output bits. As such, all of the shift registers are initialized to one. The first output bit is assigned to the most negative index of a first pilot set. For example, for Option 3, the first output bit from the PN9 sequence is assigned to the pilot subcarrier −7, the second output bit is assigned to the pilot subcarrier 7, and so on.

Figure 8:
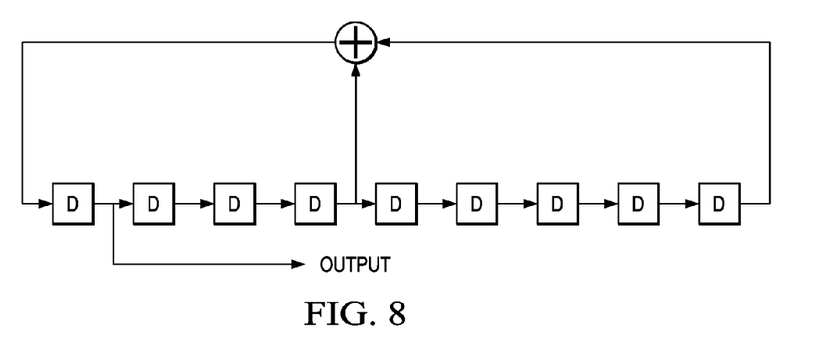
FIG. 8 illustrates a pseudo-noise generator in accordance with at least one illustrated embodiment.

FIG. 8 illustrates a PN9 generator. Each "D" represents a delay latch storing a bit. The seed input is 111111111 in at least one embodiment. Different delay latches are used for inputs into an exclusive or ("XOR") function to determine the next bit loaded into the beginning of the series of delay latches. The output is taken from any one location in the sequence. As illustrated, the output is taken from the first bit. As such, given the same seed, every similarly configured PN9 will result in a predictable sequence of output. By encoding the output in the pilot subcarriers, the channel estimation procedures described above can be performed. Provided an seed of 111111111, the first 20 output bits of the illustrated PN9 generator are 00001111011100001010110. In another embodiment, the output of the PN9 generator is mapped to a BPSK pilot, e.g., 0 maps to −1 and 1 maps to +1.

In at least one embodiment, the pilot subcarriers allocated are distributed evenly so that the distance from one pilot subcarrier to the next is the same or similar or similar in the case of an odd amount of subcarriers. This distribution is maintained even though the pilot subcarriers are staggered. As such, the implementation of channel estimation is less complex than if the distribution was not maintained. For example, when using a minimum mean squared error ("MMSE") filter, the filter coefficients need not change. Also, any receiver can use a FFT to find the channel impulse response. As such, multiple techniques for channel estimation can be applied. For example, the pilot symbols can be used in a phase locked loop to determine residual frequency offset.

Figure 9:
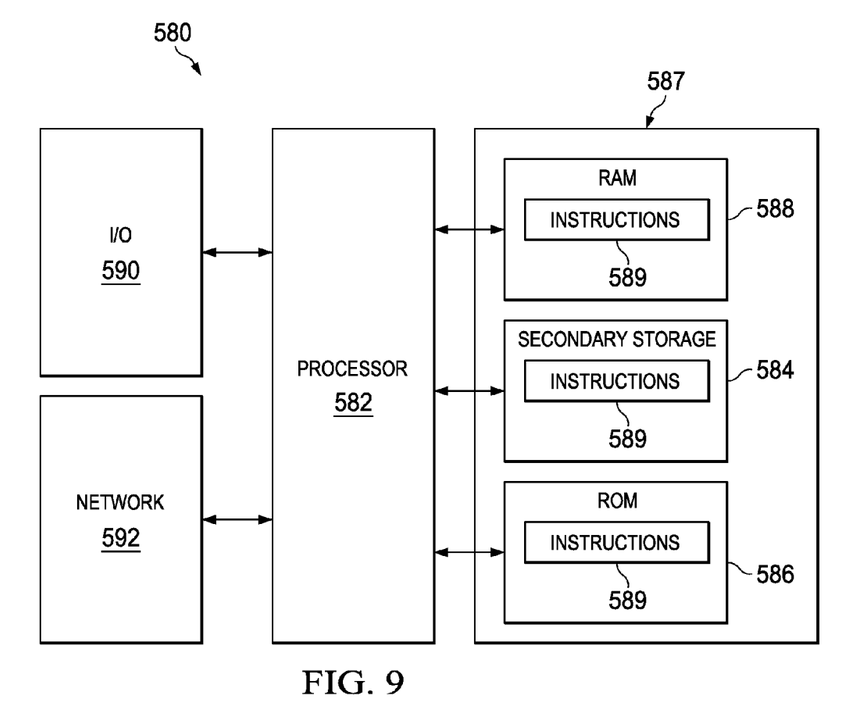
FIG. 9 illustrates a particular machine suitable for implementing one or more embodiments described herein.

The system described above may be implemented on a particular machine with sufficient processing power, memory resources, and network throughput capability to handle the necessary workload placed upon it. FIG. 9 illustrates a particular machine 580 suitable for implementing one or more embodiments disclosed herein. The computer system 580 includes one or more processors 582 (which may be referred to as a central processor unit or CPU) that are in communication with a machine-readable medium 587. The machine-readable medium 587 may comprise memory devices including secondary storage 584, read only memory (ROM) 586, and random access memory (RAM) 588. The processor is further in communication with input/output (I/O) 590 devices and network connectivity devices 592. The processor may be implemented as one or more CPU chips.

The secondary storage 584 is typically comprised of one or more disk drives, tape drives, or optical discs and is used for non-volatile storage of data and as an over-flow data storage device if RAM 588 is not large enough to hold all working data. Secondary storage 584 may be used to store programs and instructions 589 that are loaded into RAM 588 when such programs are selected for execution. The ROM 586 is used to store instructions 589 and perhaps data, which are read during program execution. ROM 586 is a non-volatile memory device that typically has a small memory capacity relative to the larger memory capacity of secondary storage. The RAM 588 is used to store volatile data and perhaps to store instructions 589. Access to both ROM 586 and RAM 588 is typically faster than to secondary storage 584.

I/O 590 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 592 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 592 devices may enable the processor 582 to communicate with an Internet or one or more intranets. With such a network connection, the processor 582 may receive information from the network, or may output information to the network in the course of performing the above-described method steps. Such information, which is often represented as a sequence of instructions 589 to be executed using processor 582, may be received from and output to the network, for example, in the form of a computer data signal embodied in a carrier wave Such information, which may include data or instructions 589 to be executed using processor 582 for example, may be received from and output to the network, for example, in the form of a computer data baseband signal or signal embodied in a carrier wave. The baseband signal or signal embodied in the carrier wave generated by the network connectivity 592 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 582 executes instructions 589, codes, computer programs, scripts which it accesses from hard disk, floppy disk, optical disc (these various disk based systems may all be considered secondary storage 584), ROM 586, RAM 588, or the network connectivity devices 592.

In an alternative embodiment, the system may be implemented in an application specific integrated circuit ("ASIC") comprising logic configured to perform any action described in this disclosure with corresponding and appropriate inputs and outputs or a digital signal processor ("DSP") similarly configured. Such logic is implemented in a transmitter, receiver, or transceiver in various embodiments.

Figure 10:
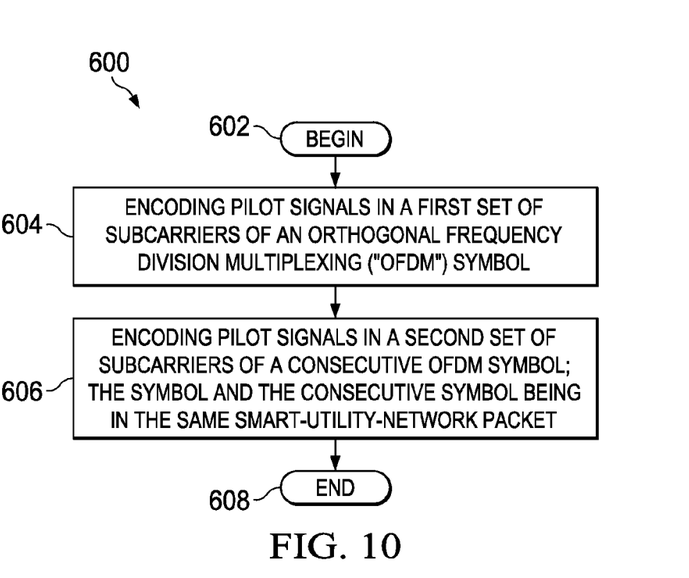
FIG. 10 illustrates a method for implementing one or more embodiments described herein.

FIG. 10 illustrates a method 600 beginning at 602 and ending at 608. In various embodiments, the method 600 comprises any action disclosed above. Preferably, the method comprises encoding pilot signals in a first set of subcarriers of an OFDM symbol at 604. At 606, pilot signals are encoded in a second set of subcarriers, different from the first set, of a consecutive OFDM symbol. The symbol and the consecutive symbol are in the same smart-utility-network packet in at least one embodiment. The symbol is the last of a first group of consecutive OFDM symbols, each encoded with pilot signals in the first set of subcarriers in at least one embodiment. Preferably, the consecutive symbol is the first of a second group of consecutive OFDM symbols, each encoded with pilot signals in the second set of subcarriers, the first group containing a same number of symbols as the second group. In at least one embodiment, the consecutive symbol is the first of a second group of consecutive OFDM symbols, each encoded with pilot signals in the second set of subcarriers, the first group containing a different number of symbols as the second group, the second group containing more symbols if Doppler spread is decreasing, the second group containing less symbols if Doppler spread is increasing. In at least one embodiment, the method 600 further comprises determining the pilot signals based on a pseudo-noise sequence.

The above disclosure is meant to be illustrative of the principles and various embodiment of the present invention. Numerous variations and modifications will become apparent to those skilled in the art once the above disclosure is fully appreciated. Additionally, audio or visual alerts may be triggered upon successful completion of any action described herein, upon unsuccessful actions described herein, and upon errors. Also, the order of actions can be varied from order described, and two or more actions may be performed concurrently.

Many modifications and other embodiments of the invention will come to mind to one skilled in the art to which this invention pertains having the benefit of the teachings presented in the foregoing descriptions, and the associated drawings. It is intended that the following claims be interpreted to embrace all variations and modifications. Therefore, it is to be understood that the invention is not to be limited to the specific embodiments disclosed. Although specific terms are employed herein, they are used in a generic and descriptive sense only and not for purposes of limitation.

What is claimed is:

1. An integrated circuit comprising logic configured to encode pilot signals in a first set of subcarriers of an orthogonal frequency division multiplexing ("OFDM") symbol and in a second set of subcarriers of a consecutive OFDM symbol; the symbol and the consecutive symbol being in the same smart-utility-network packet;
   wherein the symbol is the last of a first group of consecutive OFDM symbols, each encoded with pilot signals in the first set of subcarriers;
   wherein the consecutive symbol is the first of a second group of consecutive OFDM symbols, each encoded with pilot signals in the second set of subcarriers, the first group containing a same number of symbols as the second group.

2. An integrated circuit comprising logic configured to encode pilot signals in a first set of subcarriers of an orthogonal frequency division multiplexing ("OFDM") symbol and in a second set of subcarriers of a consecutive OFDM symbol; the symbol and the consecutive symbol being in the same smart-utility-network packet;
   wherein the symbol is the last of a first group of consecutive OFDM symbols, each encoded with pilot signals in the first set of subcarriers;
   wherein the consecutive symbol is the first of a second group of consecutive OFDM symbols, each encoded with pilot signals in the second set of subcarriers, the first group containing a different number of symbols as the second group, the second group containing more symbols if Doppler spread is decreasing, the second group containing less symbols if Doppler spread is increasing.

3. The integrated circuit of claim 1, wherein each subcarrier in the second set is not a subcarrier in the first set.

4. The integrated circuit of claim 3, wherein the second set of subcarriers have the same spacing within the consecutive symbol as the first set of subcarriers within the symbol.

5. A method, comprising:
   encoding pilot signals in a first set of subcarriers of an orthogonal frequency division multiplexing ("OFDM") symbol; and
   encoding pilot signals in a second set of subcarriers, different from the first set, of a consecutive OFDM symbol; the symbol and the consecutive symbol being in the same smart-utility-network packet;
   wherein the symbol is the last of a first group of consecutive OFDM symbols, each encoded with pilot signals in the first set of subcarriers;
   wherein the consecutive symbol is the first of a second group of consecutive OFDM symbols, each encoded with pilot signals in the second set of subcarriers, the first group containing a same number of symbols as the second group.

6. A method, comprising:
   encoding pilot signals in a first set of subcarriers of an orthogonal frequency division multiplexing ("OFDM") symbol; and
   encoding pilot signals in a second set of subcarriers, different from the first set, of a consecutive OFDM symbol; the symbol and the consecutive symbol being in the same smart-utility-network packet;
   wherein the symbol is the last of a first group of consecutive OFDM symbols, each encoded with pilot signals in the first set of subcarriers;
   wherein the consecutive symbol is the first of a second group of consecutive OFDM symbols, each encoded with pilot signals in the second set of subcarriers, the first group containing a different number of symbols as the second group, the second group containing more symbols if Doppler spread is decreasing, the second group containing less symbols if Doppler spread is increasing.

7. An integrated circuit comprising logic configured to encode pilot signals in a first set of subcarriers of an orthogonal frequency division multiplexing ("OFDM") symbol and in a second set of subcarriers of a consecutive OFDM symbol; the symbol and the consecutive symbol being in the same smart-utility-network packet;
   wherein a set of subcarriers, from which the first set of subcarrier and the second set of subcarrier are selected, are numbered from −52 to 52;
   wherein the pilot signals are encoded on
      subcarriers −38, −26, −14, −2, 10, 22, 34, and 46 for a first symbol;
      subcarriers −46, −34, −22, −10, 2, 14, 26, and 38 for a next symbol;
      subcarriers −42, −30, −18, −6, 6, 18, 30, and 42 for a next symbol;
      subcarriers −46, −34, −22, −10, 2, 14, 34, and 46 for a next symbol;
      subcarriers −42, −30, −18, −6, 6, 18, 26, and 38 for a next symbol;
      subcarriers −50, −38, −26, −14, −2, 30, 42, and 50 for a next symbol;
      subcarriers −46, −34, −22, −10, 10, 22, 34, and 46 for a next symbol;
      subcarriers −42, −30, −18, −6, 2, 14, 26, and 38 for a next symbol;
      subcarriers −50, −38, −26, 6, 18, 30, 42, and 50 for a next symbol;

subcarriers −46, −34, −14, −2, 10, 22, 34, and 46 for a next symbol;
subcarriers −42, −30, −22, −10, 2, 14, 26, and 38 for a next symbol;
subcarriers −50, −18, −6, 6, 18, 30, 42, and 50 for a next symbol.

8. An integrated circuit comprising logic configured to encode pilot signals in a first set of subcarriers of an orthogonal frequency division multiplexing ("OFDM") symbol and in a second set of subcarriers of a consecutive OFDM symbol; the symbol and the consecutive symbol being in the same smart-utility-network packet;
  wherein a set of subcarriers, from which the first set of subcarrier and the second set of subcarrier are selected, are numbered from −26 to 26;
  wherein the pilot signals are encoded on
    subcarriers −14, −2, 10, and 22 for a first symbol;
    subcarriers −22, −10, 2, and 14 for a next symbol;
    subcarriers −18, −6, 6, and 18 for a next symbol;
    subcarriers −26, −14, −2, and 26 for a next symbol;
    subcarriers −22, −10, 10, and 22 for a next symbol;
    subcarriers −18, −6, 2, and 14 for a next symbol;
    subcarriers −26, 6, 18, and 26 for a next symbol.

9. An integrated circuit comprising logic configured to encode pilot signals in a first set of subcarriers of an orthogonal frequency division multiplexing ("OFDM") symbol and in a second set of subcarriers of a consecutive OFDM symbol; the symbol and the consecutive symbol being in the same smart-utility-network packet;
  wherein a set of subcarriers, from which the first set of subcarrier and the second set of subcarrier are selected, are numbered from −13 to 13;
  wherein the pilot signals are encoded on
    subcarriers −7 and 7 for a first symbol;
    subcarriers −11 and 3 for next symbol;
    subcarriers −3 and 11 for a next symbol;
    subcarriers −9 and 5 for a next symbol;
    subcarriers −5 and 9 for a next symbol;
    subcarriers −13 and 1 for a next symbol;
    subcarriers −1 and 3 for a next symbol.

10. An integrated circuit comprising logic configured to encode pilot signals in a first set of subcarriers of an orthogonal frequency division multiplexing ("OFDM") symbol and in a second set of subcarriers of a consecutive OFDM symbol; the symbol and the consecutive symbol being in the same smart-utility-network packet;
  wherein a set of subcarriers, from which the first set of subcarrier and the second set of subcarrier are selected, are numbered from −7 to 7;
  wherein the pilot signals are encoded on
    subcarriers −3 and 5 for a first symbol;
    subcarriers −7 and 1 for a next symbol;
    subcarriers −5 and 3 for a next symbol;
    subcarriers −1 and 7 for a next symbol.

* * * * *